Sept. 15, 1964   O. K. KABAT   3,148,844
MOUNTING BRACKET FOR AUTOMATIC FISHING REELS
Filed Dec. 28, 1962

INVENTOR.
OTTO KAR KABAT
BY
Merchant, Merchant & Gould
ATTORNEYS

United States Patent Office 3,148,844
Patented Sept. 15, 1964

3,148,844
MOUNTING BRACKET FOR AUTOMATIC FISHING REELS
Otto Kar Kabat, 404 Knox Ave. N., Minneapolis, Minn.
Filed Dec. 28, 1962, Ser. No. 248,009
3 Claims. (Cl. 242—106)

This invention relates to a new and very useful improvement in automatic fishing reels.

More particularly, this invention relates to a mounting bracket for a conventional spring-biased fly rod reel assembly. The bracket enables one to adapt such a reel for use as an automatic fish retriever in ice fishing and the like.

It is an object of this invention to provide a support means adapted to position a spring-biased fly reel and releasably hold the line wound thereon when partially withdrawn therefrom.

It is another object of this invention to provide a bracket for a fly reel which is adapted to hold the fly reel and automatically operate the rewind lever on such reel whereby to automatically effect reel rewind when the reel line is tightened as under the pull of a hooked fish.

It is another object of this invention to provide a bracket assembly adapting a spring-biased fly reel assembly for use in enclosed areas such as ice fishing houses and the like.

Other and further objects of this invention will become apparent to those skilled in the art from a reading of the present specification taken together with the drawings in which.

Figure 1:
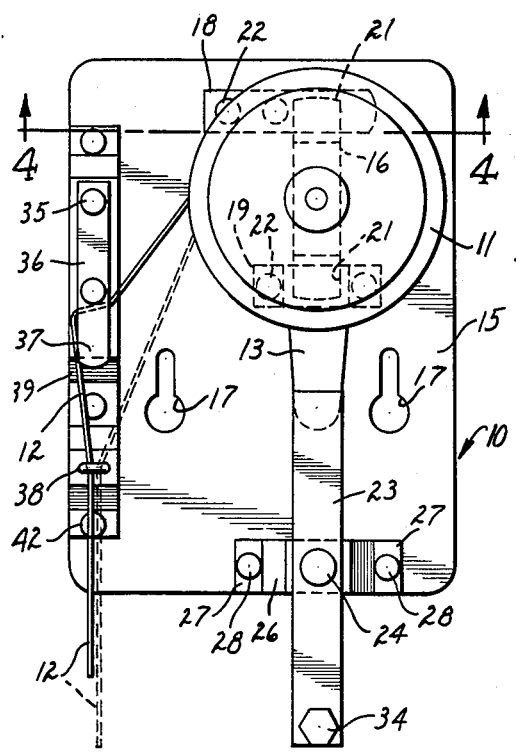
FIG. 1 is a top plan view of an embodiment of a bracket of the invention in combination with a fishing reel.

Turning to the drawings there is seen in FIG. 1 an embodiment of a bracket of the invention herein designated in its entirety by the numeral 10. Mounted on the bracket 10 is a conventional spring-biased fly reel assembly 11. The reel assembly 11 has a line 12 wound thereon but partially extended or withdrawn therefrom in the manner shown, for example, in FIGS. 1 and 2.

The bracket 10 has a rigid plate 15. The plate 15 has keyhole slots 17 for conveniently detachably mounting the plate 15 to the wall of a fish house, or the like. It will be apparent to those skilled in the art that in place of the keyhole slots 17 any conventional means for mounting the plate 15, usually in a vertical position, can be employed.

The reel assembly 11 has a radially outwardly projecting release lever 13 which, when the reel assembly 11 is positioned as shown in the drawings, is so connected with the reel assembly 11 as to release the spring-bias upon the reel of the reel assembly 11 when the end of the lever 13 is compressed toward the plate 15 thereby causing the line 12 to retract or rewind onto reel 14 in the usual and conventional manner. The reel assembly 11 also has a generally diametrically positioned attachment bar 16 whose opposite ends define a pair of radially outwardly oppositely-extending feet 21 provided for conventionally mounting the reel assembly 11 upon a fly rod (not shown). As no part of the reel assembly 11 forms a portion of this invention, additional details of its construction and operation are not given herein.

In the vicinity of the upper right-hand portion of the plate 15 (as shown in FIG. 1), there is mounted a pair of cooperating clip members 18 and 19 in spaced, generally parallel relationship to one another. Each one of said clips 18 and 19 is adapted to detachably receive a different one of said feet 21. As mounted on plate 15, clip 19 has a central raised portion. Its opposite end regions are mounted as by means of rivets 22, or the like, to plate 15. Clip 18 has an open raised end and is mounted to plate 15 as by means of rivets 22, or the like, through to its other opposed end region. Thus, when a reel assembly 11 is to be mounted upon the plate 15 of bracket 10, one conveniently manually grasps the reel assembly 11 and slips a foot 21 into the raised portion of clip 19 and then pivotally swings the other foot 21 into engagement with the second clip 18. The clip 18 can be spring-biased so as to yieldingly engage a foot 21. When it is desired to detach the feet 21 from reception in clips 18 and 19, a reverse procedure is followed. Note that the clips 18 and 19, are conveniently riveted as by rivets 22, or the like, to the plate 15.

Figures 2, 5:
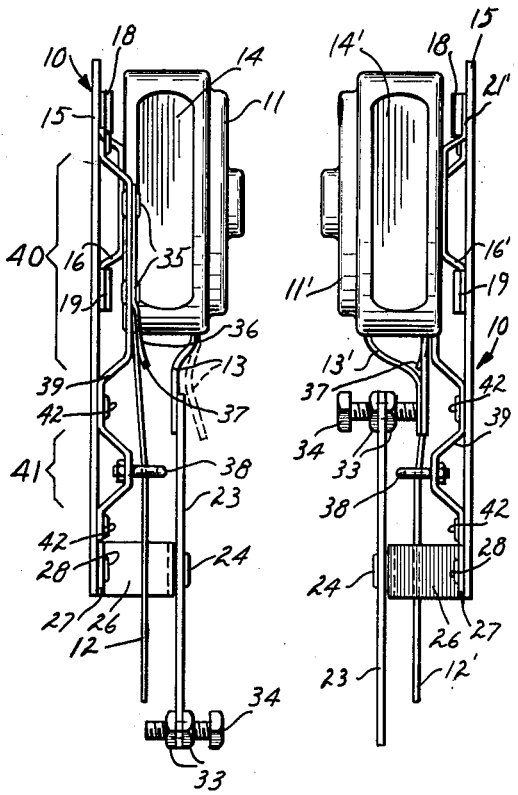
FIG. 2 is a side elevational view of the apparatus shown in FIG. 1.
FIG. 5 is a view in elevation of the opposite side to that shown in FIG. 2 showing the apparatus of FIG. 1 but using a different fishing reel.
Figure 3:
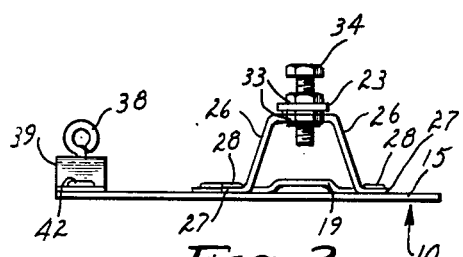
FIG. 3 is an end elevational view of the bracket embodiment shown in FIG. 1.
Figure 4:
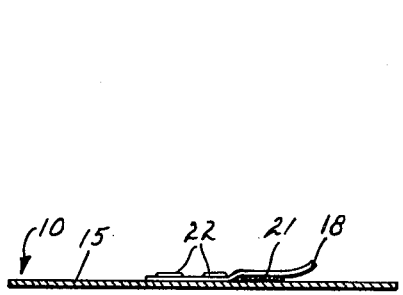
FIG. 4 is a sectional view taken along the line 4—4 of FIG. 1 with the fishing reel removed showing a portion of the bracket embodiment.

In order to hold the release lever 13 in a compressed, released position, there is mounted on plate 15 arm means which is adapted to hold such lever 13 in the desired released position. Thus, in the reel assembly 11, as can be seen in FIG. 2, the lever 13 in its locked or unreleased position has the orientation shown by the dotted lines. To be released, the lever 13 is depressed to the position shown in FIG. 2 by solid lines. To hold the lever 13 in the position shown by the solid lines, the embodiment shown utilizes an arm 23. The arm 23 is centrally, pivotally mounted upon the shank of the rivet 24. Rivet 24 is securely mounted upon a stage 26 formed by a generally U-shaped piece of material having oppositely extending foot portions 27 which are riveted by means of rivets 28 to the plate 15. The height of stage 26 from plate 15 is chosen so as to be approximately equal to the distance of lever 13 above the plate 15 when the lever 13 is in its compressed position (shown by the solid lines in FIG. 2).

Some fly reels of the spring-biased type having a radially outwardly projecting release lever are so constructed as to have this lever positioned near the bottom face of the reel (the bottom face being that upon which the attachment bar is mounted) instead of near the top face as shown in the reel assembly 11. It should be noted that the alternative embodiment of my invention shown in FIG. 5 and hereinafter described corresponds in all respects not specifically hereinafter mentioned to the above described embodiment of my invention shown in FIGS. 1 and 2. Parts or elements of the alternative embodiment in FIG. 5 which correspond to like parts or elements in FIGS. 1 and 2 are denoted by the use of the same reference characters with prime marks added thereto.

The reel assembly 11' shown in FIG. 5 has a lever 13' positioned so as to lie near the back or bottom face of the reel assembly 11'. To hold the lever 13' downwardly in the released position shown by the solid lines in FIG. 5, the opposite end of arm 23 is used. This latter end is equipped with a screw adjustment 34 to compensate for reels such as reel assembly 11' having differently positioned release levers from that employed in the reel assembly 11. By means of the screw adjustment 34 the pressure upon the lever 13' is adjusted so as to permanently tension or compress 13' in a position where the spring bias upon the reel of reel assembly 11' is released. Thus, the bracket 10 is adapted for use with any conventional reel assembly having a spring bias reel portion, a radially outwardly projecting release lever, and a generally diametrically positioned attachment bar whose opposite ends define a pair of radially outwardly, oppositely extending feet.

The screw adjustment 34 is formed by securing to an end of arm 23 a pair of nuts 33, one on either side of the arm 23, with a hole appropriately formed through arm 23 between the nuts 33. A conventional bolt is then threaded through these nuts 31 so as to complete the screw adjustment 34. Those skilled in the art will appreciate that any conventional arrangement can be used to provide the needed incremental adjustment upon the end of arm 23 for compressing a release lever 13 or 13' into a released position.

Anchor means is associated with the plate 15 for releasably holding an intermediate portion of a length of line 12 of 12' withdrawn from a reel assembly 11 or 11' mounted as described upon plate 15. This anchor means is adapted to release the line 12 in response to a force applied to the free end portion of the line 12 such as occurs when a fish is hocked by fish hook means associated with such free end line portion and pulls against the line 12. After such release, rotation of the reel 14 is effected and the line is reeled in automatically owing to the spring bias of the fly reel assembly 11 or 11'.

In the embodiment shown, such an anchor means is very simply provided by means of a simple spring clip 36, formed of spring steel in sheet form, or the like, whose rear end portion is conveniently held by means of rivets 35, or the like, in a generally vertical position near an edge of the plate 15. The spring bias on the spring clip 36 is so chosen that when line 12 is caught under the downwardly depending, forward end 37 of spring clip 36 in the manner shown, for example, in FIG. 1, the tension which the spring clip 36 exerts on the line 12 is just sufficient to retain and hold the line 12 fixedly against the continuous yielding spring bias exerted thereon by the fly reel assembly 11.

Conveniently, line 12 has guide means. Thus, in the embodiment shown, the line 12 is guided by means of an eye 38 which serves also to position the line 12 in a desired relationship to the spring clip 36 and to limit maximum line 12 retrieval during reel rewind since any object upon the end of the line (fish, hook, or the like) will butt up against the eye 38 and further retraction of the line 12 will not occur thereafter.

Conveniently, the spring clip 36 and the eye 38 are positioned in spaced relationship to the face of the plate 15 so as to avoid angular feeding of the line 12 to the reel 14 of the reel assembly 11. Such preferred spaced relationship is achieved by means of a strip 39 of sheeting or metal, or the like, which is appropriately folded and riveted to the face of the plate 15 as by means of rivets 42 so as to produce the two raised portions 40 and 41, respectively, as shown, for example, in FIG. 2. Any suitable anchor means can be employed in the bracket of the invention as those skilled in the art will appreciate.

Unless otherwise indicated in the foregoing description, the component parts of the bracket 10 of this invention can be constructed of conventional materials such as metal, sheet metal, plastic, or the like.

My invention has been thoroughly tested and found to be completely satisfactory for the accomplishment of the above objects, and while I have shown and described a preferred embodiment, I wish it to be specifically understood that the same is capable of modification without departure from the spirit and scope of the appended claims.

What I claim:

1. A mounting bracket for an automatic fly reel of the type having a spring-biased reel for automatic retrieval of the line upon engagement of an outwardly projecting release lever and also having an attachment bar so that opposite ends define a pair of oppositely extending reel feet, said brackets comprising:
   (a) a rigid base plate,
   (b) a pair of cooperating clip members each mounted on said plate for detachable reception of different ones of said reel feet,
   (c) arm means mounted on said plate and adapted to engage said release lever and hold the same in a depressed released position,
   (d) said arm means having adjustment means adapted to vary the compression exerted upon said release lever,
   (e) anchor means mounted on said plate for releasably holding an intermediate portion of line withdrawn from said reel against the released spring bias the latter of which tends to retrieve said line onto the reel,
   (f) said anchor means being adapted to release said line in response to force applied to a free end portion of said line whereby to permit rotation of the reel and retrieval of said line.

2. The structure defined in claim 1 in which said mounting bracket defines line guide means for positioning said line and adapted to limit maximum line retrieval by said reel.

3. The structure defined in claim 1 in which said arm means comprises an elongated arm which is pivotally mounted to said plate intermediate the opposite end portions of said arm, and in which said adjustment means comprises a generally transversely disposed adjustment screw carried by an end portion of said arm.

References Cited in the file of this patent

UNITED STATES PATENTS

| 2,293,755 | Joabson | Aug. 25, 1942 |
| 2,325,861 | Kreb | Aug. 3, 1943 |
| 2,714,272 | Tuttle | Aug. 2, 1955 |

FOREIGN PATENTS

| 507,528 | Italy | Dec. 30, 1954 |